(12) United States Patent
Elliott

(10) Patent No.: US 7,697,693 B1
(45) Date of Patent: Apr. 13, 2010

(54) QUANTUM CRYPTOGRAPHY WITH MULTI-PARTY RANDOMNESS

(75) Inventor: Brig Barnum Elliott, Arlington, MA (US)

(73) Assignee: BBN Technologies Corp., Cambridge, MA (US)

(*) Notice: Subject to any disclaimer, the term of this patent is extended or adjusted under 35 U.S.C. 154(b) by 1400 days.

(21) Appl. No.: 10/795,313

(22) Filed: Mar. 9, 2004

(51) Int. Cl.
    *H04L 9/08* (2006.01)
(52) U.S. Cl. ..................................................... 380/278
(58) Field of Classification Search ................... 380/278
     See application file for complete search history.

(56) References Cited

U.S. PATENT DOCUMENTS

| | | | |
|---|---|---|---|
| 4,445,116 A | 4/1984 | Grow | |
| 4,649,233 A | 3/1987 | Bass et al. | |
| 4,770,535 A | 9/1988 | Kim et al. | |
| 5,058,973 A | 10/1991 | Refregier et al. | |
| 5,157,461 A | 10/1992 | Page | |
| 5,243,649 A | 9/1993 | Franson | |
| 5,307,410 A | 4/1994 | Bennett | |
| 5,311,572 A | 5/1994 | Friedes et al. | |
| 5,325,397 A | 6/1994 | Scholz et al. | |
| 5,339,182 A | 8/1994 | Kimble et al. | |
| 5,400,325 A | 3/1995 | Chatwani et al. | |
| 5,414,771 A * | 5/1995 | Fawcett, Jr. | 380/44 |
| 5,469,432 A | 11/1995 | Gat | |
| 5,502,766 A | 3/1996 | Boebert et al. | |
| 5,515,438 A | 5/1996 | Bennett et al. | |
| 5,535,195 A | 7/1996 | Lee | |
| 5,602,916 A | 2/1997 | Grube et al. | |
| 5,675,648 A | 10/1997 | Townsend | |
| 5,710,773 A | 1/1998 | Shiga | |
| 5,720,608 A | 2/1998 | Aoki et al. | |
| 5,729,608 A | 3/1998 | Janson et al. | |

(Continued)

FOREIGN PATENT DOCUMENTS

| WO | WO 96/07951 | 3/1996 |
|---|---|---|
| WO | WO 02/05480 | 1/2002 |
| WO | WO 0205480 A1 * | 1/2002 |

OTHER PUBLICATIONS

"Quantum cryptography", Nicolas Gisin, Gregoire Ribordy, Wolfgang Tittel, and Hugo Zbinden, Group of Applied Physics, University of Geneva, Mar. 8, 2002.*

(Continued)

*Primary Examiner*—Edan Orgad
*Assistant Examiner*—Harris C Wang
(74) *Attorney, Agent, or Firm*—Ropes & Gray LLP

(57) ABSTRACT

A method and system for performing a quantum key distribution process in a quantum cryptographic system (200, 400) is provided. A first endpoint (405a) contributes a first set of random values to a quantum key distribution process. A second endpoint (405b) contributes a second set of random values to the quantum key distribution process. The first and the second endpoints (405a, 405b) derive a key based on at least some of the first set of random values and at least some of the second set of random values. In some implementations, the first endpoint (405a) may send each of the first set of random values using a basis (act 702, act 902) and the second endpoint (405b) may send an indication of received pulses and a basis for each of the received pulses (act 704, act 904).

60 Claims, 10 Drawing Sheets

U.S. PATENT DOCUMENTS

| | | | |
|---|---|---|---|
| 5,732,139 | A | 3/1998 | Lo et al. |
| 5,757,912 | A | 5/1998 | Blow |
| 5,764,765 | A | 6/1998 | Phoenix et al. |
| 5,764,767 | A | 6/1998 | Beimel et al. |
| 5,768,378 | A | 6/1998 | Townsend et al. |
| 5,768,391 | A | 6/1998 | Ichikawa |
| 5,805,801 | A | 9/1998 | Holloway et al. |
| 5,850,441 | A | 12/1998 | Townsend et al. |
| 5,911,018 | A | 6/1999 | Bischel et al. |
| 5,953,421 | A | 9/1999 | Townsend |
| 5,960,131 | A | 9/1999 | Fouquet et al. |
| 5,960,133 | A | 9/1999 | Tomlinson |
| 5,966,224 | A | 10/1999 | Hughes et al. |
| 6,005,993 | A | 12/1999 | MacDonald |
| 6,028,935 | A | 2/2000 | Rarity et al. |
| 6,052,465 | A | 4/2000 | Gotoh et al. |
| 6,097,696 | A | 8/2000 | Doverspike |
| 6,122,252 | A | 9/2000 | Aimoto et al. |
| 6,130,780 | A | 10/2000 | Joannopoulos et al. |
| 6,145,024 | A | 11/2000 | Maezawa et al. |
| 6,154,586 | A | 11/2000 | MacDonald et al. |
| 6,160,627 | A | 12/2000 | Ahn et al. |
| 6,160,651 | A | 12/2000 | Chang et al. |
| 6,188,768 | B1 | 2/2001 | Bethune et al. |
| 6,208,935 | B1 | 3/2001 | Yamada et al. |
| 6,233,075 | B1 | 5/2001 | Chang et al. |
| 6,233,393 | B1 | 5/2001 | Yanagihara et al. |
| 6,289,104 | B1 | 9/2001 | Patterson et al. |
| 6,341,127 | B1 | 1/2002 | Katsube et al. |
| 6,378,072 | B1 | 4/2002 | Collins et al. |
| 6,430,345 | B1 | 8/2002 | Dultz et al. |
| 6,438,234 | B1 | 8/2002 | Gisin et al. |
| 6,463,060 | B1 | 10/2002 | Sato et al. |
| 6,507,012 | B1 | 1/2003 | Medard et al. |
| 6,519,062 | B1 | 2/2003 | Yoo |
| 6,522,749 | B2 | 2/2003 | Wang |
| 6,529,498 | B1 | 3/2003 | Cheng |
| 6,532,543 | B1 | 3/2003 | Smith et al. |
| 6,538,990 | B1 | 3/2003 | Prorock |
| 6,539,410 | B1 | 3/2003 | Klass |
| 6,556,544 | B1 | 4/2003 | Lee |
| 6,560,707 | B2 | 5/2003 | Curtis et al. |
| 6,563,796 | B1 | 5/2003 | Saito |
| 6,594,055 | B2 | 7/2003 | Snawerdt |
| 6,605,822 | B1 | 8/2003 | Blais et al. |
| 6,646,727 | B2 | 11/2003 | Saleh et al. |
| 6,647,010 | B1 | 11/2003 | Ford et al. |
| 6,650,805 | B2 | 11/2003 | Chen et al. |
| 6,654,346 | B1 | 11/2003 | Mahalingaiah et al. |
| 6,661,806 | B1 | 12/2003 | Eriksson et al. |
| 6,678,379 | B1 | 1/2004 | Mayers et al. |
| 6,684,335 | B1 | 1/2004 | Epstein et al. |
| 6,720,589 | B1 | 4/2004 | Shields |
| 6,721,269 | B2 | 4/2004 | Cao et al. |
| 6,728,281 | B1 | 4/2004 | Santori et al. |
| 6,748,434 | B2 | 6/2004 | Kavanagh |
| 6,754,214 | B1 | 6/2004 | Mahalingaiah |
| 6,778,557 | B1 | 8/2004 | Yuki et al. |
| 6,799,270 | B1 | 9/2004 | Bull et al. |
| 6,801,626 | B1 | 10/2004 | Nambu |
| 6,836,463 | B2 | 12/2004 | Garcia-Luna-Aceves et al. |
| 6,862,564 | B2 | 3/2005 | Shue et al. |
| 6,873,797 | B2 | 3/2005 | Chang et al. |
| 6,882,431 | B2 | 4/2005 | Teich et al. |
| 6,895,091 | B1* | 5/2005 | Elliott et al. ............... 380/278 |
| 6,895,092 | B2 | 5/2005 | Tomita |
| 6,897,434 | B1 | 5/2005 | Kumar et al. |
| 6,934,472 | B2 | 8/2005 | Chang et al. |
| 6,986,056 | B1 | 1/2006 | Dultz et al. |
| 7,028,059 | B2* | 4/2006 | Williams ............... 708/250 |
| 7,035,411 | B2 | 4/2006 | Azuma et al. |
| 7,068,790 | B1 | 6/2006 | Elliott |
| 7,512,242 | B2 | 3/2009 | Pearson et al. |
| 2001/0038695 | A1 | 11/2001 | Kim |
| 2002/0015573 | A1 | 2/2002 | Ishibashi |
| 2002/0021467 | A1 | 2/2002 | Ofek et al. |
| 2002/0025041 | A1 | 2/2002 | Tomita |
| 2002/0097874 | A1 | 7/2002 | Foden et al. |
| 2002/0110245 | A1 | 8/2002 | Gruia |
| 2002/0141019 | A1 | 10/2002 | Chang et al. |
| 2003/0002074 | A1 | 1/2003 | Nambu et al. |
| 2003/0002670 | A1 | 1/2003 | Wang |
| 2003/0002674 | A1* | 1/2003 | Nambu et al. ............... 380/256 |
| 2003/0059157 | A1 | 3/2003 | DeCusalis et al. |
| 2003/0137944 | A1 | 7/2003 | Medvinsky |
| 2003/0180042 | A1 | 9/2003 | Nelles et al. |
| 2003/0215088 | A1 | 11/2003 | Bao |
| 2003/0231771 | A1 | 12/2003 | Gisin et al. |
| 2004/0005056 | A1 | 1/2004 | Nishioka et al. |
| 2004/0008843 | A1 | 1/2004 | Van Enk |
| 2004/0019676 | A1 | 1/2004 | Iwatsuki et al. |
| 2004/0032954 | A1 | 2/2004 | Bonfrate et al. |
| 2004/0109564 | A1 | 6/2004 | Cerf et al. |
| 2004/0136321 | A1 | 7/2004 | Ren et al. |
| 2004/0165884 | A1 | 8/2004 | Al-Chalabi |
| 2004/0190725 | A1 | 9/2004 | Yuan et al. |
| 2005/0036624 | A1 | 2/2005 | Kent et al. |
| 2005/0094818 | A1 | 5/2005 | Inoue et al. |
| 2006/0059343 | A1* | 3/2006 | Berzanskis et al. .......... 713/171 |
| 2006/0252381 | A1 | 11/2006 | Sasaoka et al. |

OTHER PUBLICATIONS

U.S. Appl. No. 09/943,709, Systems And Methods For Path Set-Up In A Quantum Key Distribution Network, filed Aug. 31, 2001.

U.S. Appl. No. 09/944,328, Quantum Cryptographic Key Distribution Networks With Untrusted Switches, filed Aug. 31, 2001.

U.S. Appl. No. 10/197,659, Key Distribution Center For Quantum Cryptographic Key Distribution Networks, filed Jul. 17, 2002.

U.S. Appl. No. 10/218,652, Methods And Systems For Distributing A Group Key In A Quantum Cryptographic Key Distribution Network, filed Aug. 14, 2002.

U.S. Appl. No. 10/271,103, Systems And Methods For Framing Quantum Cryptographic Links, filed Oct. 15, 2002.

U.S. Appl. No. 10/271,150, Quantum Cryptographic System With Photon Counting Detector, filed Oct. 15, 2002.

U.S. Appl. No. 10/289,192, Systems And Methods For Implementing A Unified Framework For Quantum Crypographic Protocols, filed Nov. 6, 2002.

U.S. Appl. No. 10/325,325, Systems And Methods For Implementing Adaptive Quantum Cryptography, filed Dec. 18, 2002.

U.S. Appl. No. 10/324,040, Key Transport In Quantum Cryptographic Networks, filed Dec. 20, 2002.

U.S. Appl. No. Systems And Methods For Managing Quantum Cryptographic Networks, filed Dec. 20, 2002.

U.S. Appl. No. 10/384,502, Autoconfiguration Via Quantum Cryptographic Link Framing, filed Mar. 7, 2003.

U.S. Appl. No. 10/394,974, Systems And Methods For Implementing A Sifting Protocol For Quantum Cryptograpy, filed Mar. 21, 2003.

U.S. Appl. No. 10/402,120, Quantum Cryptography Via Phase-Entangled Encoding, filed Mar. 28, 2003.

U.S. Appl. No. 10/434,248, Quantum Cipher Key Distribution Via Phase-Entangled Encoding Of Key Symbols, filed May 7, 2003.

U.S. Appl. No. 10/462,292, Automatic Control Of Quantum Key Distribution, filed Jun. 16, 2003.

U.S. Appl. No. 10/462,400, Quantum Cryptography Based on Phase Entangled Photons, filed Jun. 16, 2003.

U.S. Appl. No. 10/716,078, Systems and Methods for Implementing Path Length Control for Quantum Cryptographic Systems, filed Nov. 18, 2003.

U.S. Appl. No. 10/716,747, Systems and Methods for Implementing Training Frames for Quantum Cryptographic Links, filed Nov. 18, 2003.

U.S. Appl. No. 10/786,314, Systems and Methods for Reserving Cryptographic Key Material, filed Feb. 26, 2004.

U.S. Appl. No. 10/795,398, Simple Untrusted Network for Quantum Cryptography, filed Mar. 9, 2004.

U.S. Appl. No. 10/797,140, Systems and Methods for Implementing Adaptive Training for Quantum Cryptography, filed Mar. 11, 2004.

U.S. Appl. No. 10/799,177, Systems and Methods for Implementing Routing Protocols and Algorithms for Quantum Cryptographic Key Transport, filed Mar. 12, 2004.

U.S. Appl. No. 10/800,481, Systems and Methods for Implementing an Error Detection and Correction Protocol for Quantum Cryptography, filed Mar. 15, 2004.

U.S. Appl. No. 10/803,509, Systems and Methods for Quantum Cryptographic Key Transport, filed Mar. 18, 2004.

"Quantum key distribution: Real-time compensation of interferometer phase drift," NTNU Department of Physical Electronics, pp. 1-45.

"Quantum Public Key Distribution System," IBM Technical Disclosure Bulletin, 28(7):3153-3163 (Dec. 7, 1985).

Awduche, D.O., et al., "Multi-Protocol Lambda Switching: Combining MPLS Traffic Engineering Control With Optical Crossconnects," Internet Draft (Jan. 2001).

Basak, D., et al., "Multi-protocol Lambda Switching: Issues in Combining MPLS Traffic Engineering Control With Optical Cross-connects," Internet draft (Aug. 2000).

Bennett, C.H., et al., "Experimental Quantum Cryptography," Journal of Cryptography's special issue after Eurocrypt '90, 28 pages (Sep. 1991).

Bennett, C.H., et al., "Generalized Privacy Amplification," IBM Research, 24 pages (May 31, 1995).

Bennett, C.H., et al., "Quantum Cryptography: Public Key Distribution and Coin Tossing," Proceedings of IEEE International Conference on Computers, Systems & Signal Processing, Bangalore, India, pp. 175-179, Dec. 10-12, 1984.

Bethune, D.S., et al., "An Autocompensating Fiber-Optic Quantum Cryptography System Based on Polarization Splitting of Light," IEEE Journal of Quantum Electronics, XX(Y):100-108 (1999).

Bethune, D.S., et al., "Prototype Autocompensating Quantum Cryptography System Based on Polarization Splitting of Light," Session QC41—Quantum Computing and Cryptograph, Oral session, Wednesday morning, Mar. 24, 1999, Liberty Room, Omni Hotel.

Brassard, G., et al., "Cryptology column—25 Years of Quantum Cryptography," Pragocrypt, pp. 13-24 (Jul. 1996).

Brassard, G., et al., "Secret-Key Reconciliation by Public Discussion," Department IRO, Universite de Montreal, 14 pages (1994).

Cabello, A., "Multiparty key distribution and secret sharing based on entanglement swapping," pp. 1-8, (Sep. 7, 2000).

Collins, G.P., "Quantum Cryptography Defies Eavesdropping," Physics Today, pp. 21-23 (Nov. 1992).

Crepeau, C., et al., "Secure Multi-party Quantum Computation," ACM, pp. 1-10 (2001).

Bennett, C.H., "Quantum Cryptography Using Any Two Nonorthogonal States," Physical Review Letters, 68(21):3121-3124 (1992).

Bennett, C.H., et al., "Experimental Quantum Cryptography," J. Cryptology, 5:3-28 (1992).

Butler, W.T., et al. "Free space quantum-key distribution," Physical Review A, 57(4):2379-2382 (Apr. 1998).

Jacobs, B.C., et al., "Quantum cryptography in free space," Optics Letters, 21(22):1854-1856 (Nov. 1996).

Bethune, D.S., et al., An Autocompensating Fiber-Optic Quantum Cryptography System Based on Polarization Splitting of Light, IEEE Journal of Quantum Electronics, 36(3):340-347 (2000).

Imamoglu, A., et al., "Turnstile Device for Heralded Single Photons: Coulomb Blockade of Electron and Hole Tunneling in Quantum Confined p-i-n. Heterojunctions," Physical Review Letters, 72(2):210-213 (1994).

Charles H. Bennett et al.: "Quantum Cryptography: Public Key Distribution and Coin Tossing"; International Conference on Computers, Systems & Signal Processing; Dec. 10-12, 1984; 5 pages.

Valerio Scarani et al.: "Quantum cryptography protocols robust against photon number splitting attacks for weak laser pulses implementations," Physical Review Letters, vol. 92, No. 5; Feb. 2004; pp. 057901-1 through 057901-4.

Valerio Scarani et al.: "Quantum cryptography protocols robust against photon number splitting attacks," ERATO Conference on Quantum Information Science 2003, Sep. 4-6, 2003, Niijimakaikan, Kyoto Japan; 2 pages.

Office Action issued for U.S. Appl. No. 10/716,078, filed on Sep. 26, 2007.

Office Action issued for U.S. Appl. No. 10/786,314, filed on Oct. 29, 2007.

Office Action issued for U.S. Appl. No. 10/795,398, filed on Oct. 11, 2007.

Elliott, C., "Building the quantum network," New Journal of Physics, vol. 4, No. 46, 2002.

Office action issued on Oct. 29, 2007 for U.S. Appl. No. 10/786,314.

Office action issued on Oct. 11, 2007 for U.S. Appl. No. 10/795,398.

Eisenberg, S., "Lucent Technologies names Cherry Murray physical sciences research vice president," Press Release (Mar. 28, 2000).

Ekert, A.K., "Quantum Cryptography Based on Bell's Theorem," Physical Review Letters, 67(6):661-663 (1991).

Elliott, B.B., et al., "Path-length control in a interferometric QKD link," Proc. of SPIE, vol. #5101, 11 pages. (Apr. 21, 2003).

Elliott, C., "Building the quantum network," New J. Phys., 4:46 (2002).

Franson, J.D., "Bell Inequality for Position and Time," Physical Review Letters, 62(19):2205-2208 (1989).

Franson, J.D., "Violations of a New Inequality for Classical Fields," John Hopkins University, NTIS-NASA Publication; Goddard Space Flight Center; Workshop in Squeezed States and Uncertainty Relations, Feb. 1991, pp. 23-32.

Gisin, N., et al., "Quantum cryptography and long distance Bell experiments: How to control decoherence," Geneva, Switzerland, pp. 1-7 and 4 pages of drawings (Jan. 15, 1999).

Gisin, N., et al., "Quantum cryptography," Reviews of Modern Physics, 74:145-184 (2002).

Gottesman, D., et al., "Secure quantum key distribution using squeezed states," pp. 1-19 (Sep. 25, 2000).

Jennewein, T., et al., "Quantum Cryptography with Entangled Photons," Physical Review Letters, 84(20):4729-4732 (2000).

Lin, L.Y., et al., "Free-Space Micromachined Optical Switches for Optical Networking," IEEE Journal of Selected Topics in Quantum Electronics. 5(1):4-9 (1999).

Maurer, U., et al., "Information-Theoretic Key Agreement: From Weak to Strong Secrecy for Free," Computer Science Department, Swiss Federal Institute of Technology, 20 pages. (2000).

Maurer, U.M., "Secret Key Agreement by Public Discussion From Common Information," IEEE Transactions on Information Theory, 39:733-742 (1993).

Mo, X., et al., "Intrinsic-Stabilization Uni-Directional Quantum Key Distribution Between Beijing and Tianjin," Key Lab of Quantum Information, Department of Electronic Engineering and Information Science, University of Science and Technology of China, Hefei, Anhui.

Naik, D.S., et al., "Entangled State Quantum Cryptography: Eavesdropping on the Ekert Protocol," Physical Review Letters, 84(20):4733-4736 (2000).

Phoenix, S.J.D., et al, "Multi-user quantum cryptography on optical networks," Journal of Modern Optics, 42(6)1155-1163 (1995).

Ribordy, G., et al., "Long-distance entanglement-based quantum key distribution," Physical Review A, vol. 63, 012309-1-012309-12 (2001).

Rosen, E., et al, "Multiprotocol Label Switching Architecture," MPLS Architecture, 1-61 (Jan. 2001).

Schneier, B., "Applied Cryptography," Second Edition, Chapter 10, Oct. 18, 1995, Wiley & Sons Publ., pp. 216-220.

Slutsky, B., et al., "Defense frontier analysis of quantum cryptographic systems," Applied Optics, 37(14):2869-2878 (1998).

Stucki, D., et al., "Quantum Key Distribution over 67 km with a plug&play system," New Journal of Physics, 41.1-41.8 (2002).

Tanzilll, S., et al., "PPLN waveguide for quantum communication," Eur. Phys. J.D., 18:155-160 (2002).

Tittel, W., et al., "Long-distance Bell-type tests using energy-time entangled photons," Physical Review A, 59(6):4150-4163 (1999).

Townsend, P.D., "Secure key distribution system based on quantum cryptography," Electronic Letters, 30(10):809-811 (1994).

Townsend. P.D., et al., "Enhanced Single Photon Fringe Visibility in a 10km-Long Prototype Quantum Cryptography Channel," Electronic Letters. 29(14):1291-1293 (1993).

Townsend, P.D., et al., "Single Photon Interference in 10km Long Optical Fiber Interferometer," Electronic Letters, 29(7):634-635 (1993).

Walker, J.A., "Telecommunications Applications of MEMS," mstnews, pp. 6-9 (Mar. 2000).

Xiao, L., et al., "Efficient Multi-Party Quantum Secret Sharing Schemes," pp. 1-7 (May 28, 2004).

Degermark, M., et al., "Small Forwarding Tables for Fast Routing Lookups," ACM, pp. 3-14 (1997).

Estrin, D., et al., "Security Issues in Policy Routing," IEEE, pp. 183-193 (1989).

Garcia-Luna-Aceves, J. J., et al., "Distributed, Scalable Routing Based on Vectors of Link States," IEEE, pp. 1383-1395 (1995).

Garcia-Luna-Aceves, J. J., et al., "Scalable link-state Internet routing," Network Protocols, pp. 52-61 (Oct. 13-16, 1998).

Lakshman, T. V., et al., "High-Speed Policy-based Packet Forwarding Using Efficient Multi-dimensional Range Matching," ACM, pp. 203-214 (1998).

Lampson, B., et al., "IP Lookups Using Multiway and Multicolumn Search," IEEE/ACM Transactions on Networking, 7(3):324-334 (1999).

Ramanathan, R., et al., "Hierarchically-organized, multihop mobile wireless networks for quality-of-service support," Mobile Networks and Applications, 3:101-119 (1998).

Tsai, W. T., et al., "An Adaptive Hierarchical Routing Protocol," IEEE Transactions on Computers, 38(8):1059-1075 (1989).

Waldvogel, M., et al., "Scalable High Speed IP Routing Lookups," ACM, pp. 25-36 (1997).

Bowers, J.E., "Optical Network and Component Trends," UCSB, NSF Workshop, 51 pages.

Honjo, T., et al., "Differential-phase-shift Quantum Key Distribution," NTT Technical Review, 2(12):26-33 (Dec. 2004).

Nambu, Y., et al., "BB84 Quantum Key Distribution System based on Silica-Based Planar Lightwave Circuits," Fundamental and Environmental Research Laboratories and Fiber Optic Devices Division, pp. 1-11.

Paniccia, M., "Silicon Integrated Photonics," UCSB, 30 pages, Feb. 2, 2005.

Tomita, A., et al., "Recent Progress in Quantum Key Transmission," NEC J. of Adv. Tech., 2(1):84-91 (Winter 2005).

Galindo et al., "Information and computation: Classical and quantum aspects," May 8, 2002, http://prola.aps.org/.

Gisin, N. "Quantum Cryptography on Noisy Channels: Quantum versus Classical Key-Agreement Protocols," The American Physical Society, Physical Review Letter, vol. 83, No. 20, pp. 4200-4203, Nov. 1999.

Huang, N., "A Novel IP-Routing Lookup Scheme and Hardware Architecture for Multigigabit Switching Routers," IEE Journal of Selected Areas in Communication, vol. 17, No. 6, pp. 1093-1104, Jun. 1999.

Hughes, et al., "Practical quantum key distribution over a 48-km optical fiber network", Los Alamos National Laboratory, Apr. 8, 1999, http://arxiv.org/abs/quant-ph/9904038.

"Laser End-Point Detection System", IBM Technical Disclosure Bulletin, vol. 28, No. 7, pp. 3151-3163, Dec. 1985.

Liu, S., et al., "A Practical Protocol for Advantage Distillation and Information Reconciliation", Designs, Codes & Cryptography, vol. 30, No. 1, pp. 39-62, Aug. 2003.

Mauer, et al., "Unconditionally Secure Key Agreement and the Intrinsic Conditional Information", IEEE Transactions on Information Theory, vol. 45, No. 2, pp. 499-514, Mar. 1999.

Merolla et al., "Quantum cryptographic device using single-photon phase modulation," Physical Review A, vol. 60, No. 3, Sep. 1999.

Tittel et al., "Quantum Cryptography Using Entangled Photons in Energy-Time Bell States," Physical Review Letters, vol. 84, No. 20, pp. 4737-4740, May 2000.

Zhang, "Cryptographically Resilient Functions", IEE Transactions on Information Theory, vol. 43, No. 5, pp. 1740-1747, Sep. 1997. Found at: http://ieeexplore.ieee.org/iel3/18/13537/00623184.pdf?tp+&arnumber=623184&isnumber=135 1. 1351.

Office Action issued on Mar. 31, 2005 in U.S. Appl. No. 09/943,709.

Office Action issued Oct. 5, 2005 in U.S. Appl. No. 09/944,328.

Office action issued on Oct. 6, 2005 in U.S. Appl. No. 09/943,709.

Office action issued on Feb. 15, 2006 in U.S. Appl. No. 10/271,103.

Office action issued on Aug. 8, 2006 in U.S. Appl. No. 10/271,103.

Office action issued on Nov. 17, 2006 in U.S. Appl. No. 09/944,328.

Office Action issued May 25, 2007 in U.S. Appl. No. 10/218,652.

Office action issued Jul. 10, 2007 in U.S. Appl. No. 10/795,313.

Office Action issued Sep. 6, 2007 in U.S. Appl. No. 10/803,509.

Office Action issued Oct. 23, 2007 in U.S. Appl. No. 10/324,355.

Office action issued on Nov. 26, 2007 in U.S. Appl. No. 10/716,747.

Office Action issued Dec. 27, 2007 for U.S. Appl. No. 10/795,313.

Office Action issued Jun. 24, 2009 in U.S. Appl. No. 10/799,177.

U.S. Appl. No. 09/611,783 filed Jul. 7, 2000 entitled Systems and Methods for Implementing a Quantum-Cryptographic Communications Network, 42 pages.

* cited by examiner

QUANTUM CRYPTOGRAPHY WITH MULTI-PARTY RANDOMNESS

GOVERNMENT CONTRACT

The U.S. Government has a paid-up license in this invention and the right in limited circumstances to require the patent owner to license others on reasonable terms as provided for by the terms of Contract No. F30602-01-C-0170, awarded by the Defense Advanced Research Project Agency (DARPA).

TECHNICAL FIELD

The present invention relates generally to quantum cryptographic systems and, more particularly, to systems and methods for permitting multiple parties to contribute randomness in a quantum key distribution process.

BACKGROUND OF THE INVENTION

Within the field of cryptography, it is well recognized that the strength of any cryptographic system depends, among other things, on the key distribution technique employed. For conventional encryption to be effective, such as a symmetric key system, two communicating parties must share the same key and that key must be protected from access by others. The key must, therefore, be distributed to each of the parties.

FIG. 1 shows one form of a conventional existing key distribution process. As shown in FIG. 1, for a party, Bob, to decrypt ciphertext encrypted by a party, Alice, Alice or a third party must share a copy of the key with Bob. This distribution process can be implemented using a number of known methods including the following: 1) Alice can select a key and physically deliver the key to Bob; 2) a third party can select a key and physically deliver the key to Bob; 3) if Alice and Bob both have an encrypted connection to a third party, the third party can deliver a key on the encrypted links to Alice and Bob; 4) if Alice and Bob have previously used an old key, Alice can transmit a new key to Bob by encrypting the new key with the old; and 5) Alice and Bob may agree on a shared key via a one-way mathematical algorithm, such as Diffie-Hellman key agreement.

All of these distribution methods are vulnerable to interception of the distributed key by an eavesdropper, Eve, or by Eve "cracking" the supposedly one-way algorithm. Eve can eavesdrop and intercept or copy a distributed key and then subsequently decrypt any intercepted ciphertext that is sent between Bob and Alice. In existing cryptographic systems, this eavesdropping may go undetected, with the result being that any ciphertext sent between Bob and Alice is compromised.

To combat these inherent deficiencies in the key distribution process, researchers have developed a key distribution technique called quantum cryptography. Quantum cryptography employs quantum systems and applicable fundamental principles of physics to ensure the security of distributed keys. Heisenberg's uncertainty principle mandates that any attempt to observe the state of a quantum system will necessarily induce a change in the state of the quantum system. Thus, when very low levels of matter or energy, such as individual photons, are used to distribute keys, the techniques of quantum cryptography permit the key distributor and receiver to determine whether any eavesdropping has occurred during the key distribution. Quantum cryptography, therefore, prevents an eavesdropper, like Eve, from copying or intercepting a key that has been distributed from Alice to Bob without a significant probability of Bob's or Alice's discovery of the eavesdropping.

An existing quantum key distribution (QKD) scheme involves a quantum channel, through which Alice and Bob send keys using polarized or phase encoded photons, and a public channel, through which Alice and Bob send ordinary messages. Since these polarized or phase encoded photons are employed for QKD, they are often termed QKD photons. The quantum channel is a path, such as through air or an optical fiber, that attempts to minimize the QKD photons' interaction with the environment. The public channel may comprise a channel on any type of communication network, such as a Public Switched Telephone network, the Internet, or a wireless network.

An eavesdropper, Eve, may attempt to measure the photons on the quantum channel. Such eavesdropping, however, will induce a measurable disturbance in the photons in accordance with the Heisenberg uncertainty principle. Alice and Bob use the public channel to discuss and compare the photons sent through the quantum channel. If, through their discussion and comparison, they determine that there is no evidence of eavesdropping, then the key material distributed via the quantum channel can be considered completely secret.

FIGS. 2 and 3 illustrate an existing scheme 200 for quantum key distribution in which the polarization of each photon is used for encoding cryptographic values. To begin the quantum key distribution process, Alice generates random bit values and bases 205 and then encodes the bits as polarization states (e.g., 0°, 45°, 90°, 135°) in sequences of photons sent via the quantum channel 210 (see row 1 of FIG. 3). Alice does not tell anyone the polarization of the photons she has transmitted. Bob receives the photons and measures their polarization along either a rectilinear or diagonal basis that is randomly selected with substantially equal probability. Bob records his chosen basis (see row 2 of FIG. 3) and his measurement results (see row 3 of FIG. 3).

Bob and Alice discuss 215, via the public channel 220, which basis he has chosen to measure each photon. Bob, however, does not inform Alice of the result of his measurements. Alice tells Bob, via the public channel, whether he has made the measurement along the correct basis (see row 4 of FIG. 3). In a process called "sifting" 225, both Alice and Bob then discard all cases in which Bob has made the measurement along the wrong basis and keep only the ones in which Bob has made the measurement along the correct basis (see row 5 of FIG. 3).

Alice and Bob then estimate 230 whether Eve has eavesdropped upon the key distribution. To do this, Alice and Bob must agree upon a maximum tolerable error rate. Errors can occur due to the intrinsic noise of the quantum channel and eavesdropping attack by a third party. Alice and Bob choose randomly a subset of photons m from the sequence of photons that have been transmitted and measured on the same basis. For each of the m photons, Bob announces publicly his measurement result. Alice informs Bob whether his result is the same as what she had originally sent. They both then compute the error rate of the m photons and, since the measurement results of the m photons have been discussed publicly, the polarization data of the m photons are discarded. If the computed error rate is higher than the agreed upon tolerable error rate (typically no more than about 15%), Alice and Bob infer that substantial eavesdropping has occurred. They then discard the current polarization data and start over with a new sequence of photons. If the error rate is acceptably small, Alice and Bob adopt the remaining polarizations, or some algebraic combination of their values, as secret bits of a shared secret key 235, interpreting horizontal or 45 degree polarized photons as binary 0's and vertical or 135 degree photons as binary 1's (see row 6 of FIG. 3).

Alice and Bob may also implement an additional privacy amplification process 240 that reduces the key to a small set of derived bits to reduce Eve's knowledge of the key. If, subsequent to discussion 215 and sifting 225, Alice and Bob adopt n bits as secret bits, the n bits can be compressed using, for example, a hash function. Alice and Bob agree upon a publicly chosen hash function $f$ and take $K=f$(n bits) as the shared r-bit length key K. The hash function randomly redistributes the n bits such that a small change in bits produces a large change in the hash value. Thus, even if Eve determines a number of bits of the transmitted key through eavesdropping, and also knows the hash function $f$, she still will be left with very little knowledge regarding the content of the hashed r-bit key K. Alice and Bob may further authenticate the public channel transmissions to prevent a "man-in-the-middle" attack in which Eve masquerades as either Bob or Alice.

Sifting is described in the paper, "Quantum Cryptography: Public Key Distribution and Coin Tossing," by Charles H. Bennett and Giles Brassard, International Conference on Computers, Systems & Signal Processing, December 1984. A known variation on sifting, called the Geneva protocol, provides protection against an eavesdropping attack, called a photon-number splitting attack. The Geneva protocol is described in, "Quantum Cryptography Protocols Robust Against Photon Number Splitting Attacks," by V. Scarani, A. Acin, G. Ribordy, N. Ribordy and N. Gisin, ERATO Conference on Quantum Information Science 2003, Sep. 4-6, 2003, Niijima-kaikan, Kyoto Japan. In existing sifting protocols, both parties select a 'basis' for each light pulse, but only one of the parties contributes a 'value.' For example, in the sifting protocols discussed above, a one-way system is described. In one-way systems and plug and play systems, one party may contribute the 'value.' In a typical quantum system based on entanglement, a source of entangled photons contributes the 'value' (automatically by the physical process that produces entangled pairs).

To ensure that the party contributing the 'value' does so in a random fashion, the contributing party must continually monitor its random sequences to check for bias. If bias is found, the contributing party either compensates for any observed bias or, when the bias is too severe for compensation, the contributing party may shut down the system. The bias monitoring, in general, is rather crude and it is quite possible that a party's random number generator may exhibit patterns of bias that are not detected by any checking procedure. Such patterns will degrade the quality of the cryptographic key produced by the system because any pattern to the randomness decreases the entropy of the key material. Furthermore, low-quality cryptographic key material may be produced for some time before subtle patterns of bias are detected.

Existing, non-quantum cryptographic systems perform a bias check. In addition, however, these non-quantum systems often obtain randomness by combining random number inputs from two different parties under the assumption that if one or both parties' random number generators are biased, in general, these problems will not be correlated. For example, in an existing Diffey-Hellman key agreement technique, each party (Alice and Bob) independently formulates a random number. A distributed calculation uses the two random numbers to determine a shared key. Thus, proper combination of two generators may lead to randomness of a higher quality than use of a single random number generator alone.

A quantum cryptographic system that allows multiple parties to contribute random values for the quantum key distribution process is needed in order to decrease the probability of generating biased cryptographic keys.

SUMMARY OF THE INVENTION

A quantum cryptographic system and a method are provided for permitting multiple parties to contribute randomness to a quantum key distribution process.

In a first aspect of the invention, a method for performing quantum key distribution in a quantum cryptographic system is provided. A first endpoint contributes a first set of random values to a quantum key distribution process. A second endpoint contributes a second set of random values to the quantum key distribution process. The first and the second endpoints derive a key based on at least some of the first set of random values and at least some of the second set of random values.

In a second aspect of the invention, a quantum cryptographic system is provided. The quantum cryptographic system includes a first quantum key distribution endpoint and a second quantum key distribution endpoint, both of which are configured to communicate via a quantum channel. The first and the second quantum key distribution endpoints are further configured to contribute a first set of random values and a second set of random values, respectively, to a quantum key distribution process. The first and the second quantum key distribution endpoints are further configured to derive a key based on at least some of the first set of random values and at least some of the second set of random values.

In a third aspect of the invention, a quantum key distribution endpoint is provided. The quantum key distribution endpoint includes a bus, a transceiver coupled to the bus, a memory coupled to the bus, and a processing unit coupled to the bus. The memory includes a group of instructions for the processing unit, such that when the quantum key distribution endpoint is configured as a first quantum key distribution endpoint, the processing unit is configured to: contribute a first set of random values to a quantum key distribution process with a second quantum key distribution endpoint, receive a second set of random values from the second quantum key distribution endpoint, and derive a key based on at least some of the first set of random values and at least some of the second set of random values.

In a fourth aspect of the invention, a quantum key distribution endpoint is provided. The quantum key distribution endpoint includes means for contributing a first set of random values to a quantum key distribution process with a second quantum key distribution endpoint, means for receiving a second set of random values from a second quantum key distribution endpoint, and means for deriving a key based on at least some of the first set of random values and at least some of the second set of random values.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 4:
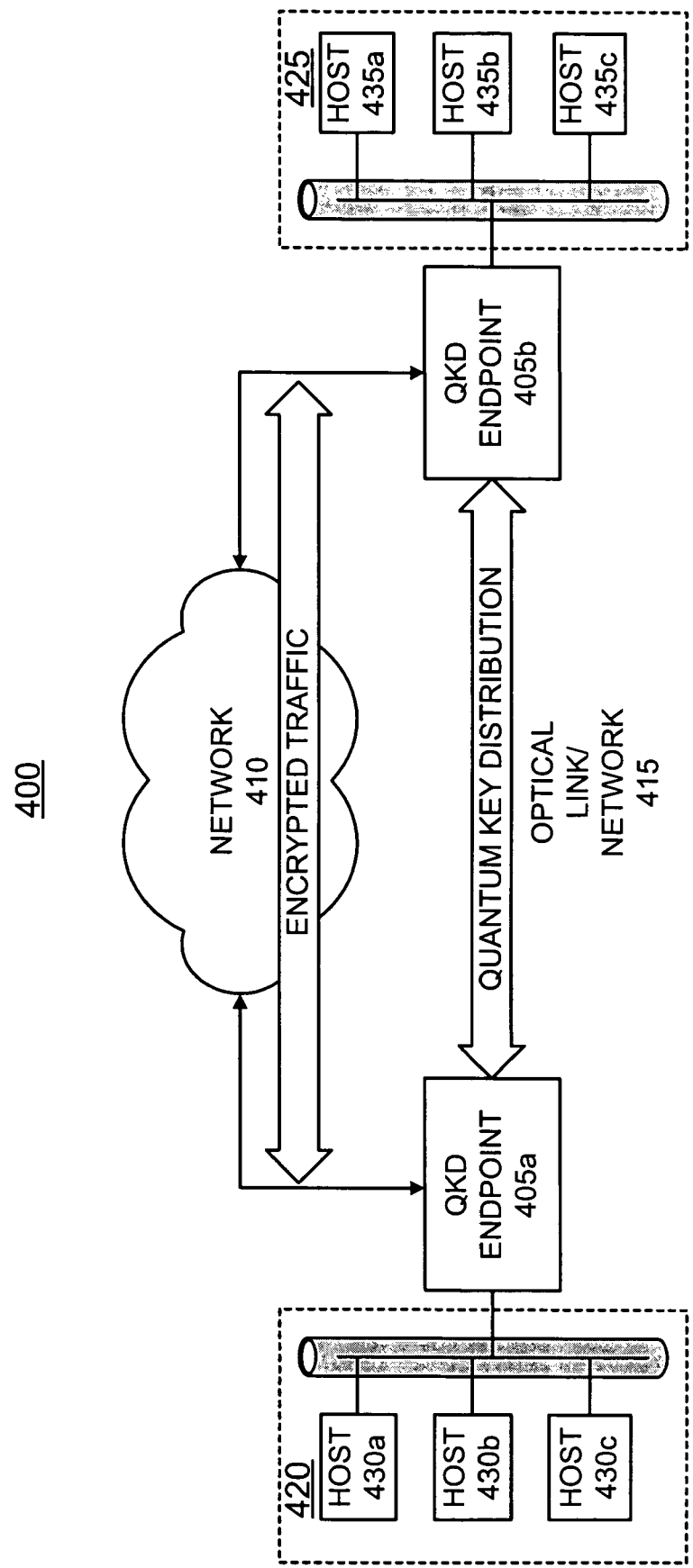
FIG. 4 illustrates an exemplary network in which systems and methods, consistent with the present invention, may be implemented.

The following detailed description of the invention refers to the accompanying drawings. The same reference numbers in different drawings may identify the same or similar elements. Also, the following detailed description does not limit the invention. Instead, the scope of the invention is defined by the appended claims Exemplary Network FIG. 4 illustrates an exemplary network 400 in which systems and methods, consistent with the present invention, that distribute encryption keys via quantum cryptographic mechanisms can be implemented. Network 400 may include QKD endpoints 405a and 405b connected via a network 410 and an optical link/network 415. QKD endpoints 405a and 405b may each include a host or a server. QKD endpoints 405a and 405b may further connect to local area networks (LANs) 420 or 425. LANs 420 and 425 may further connect with hosts 430a-430c and 435a-435c, respectively.

Network 410 can include one or more networks of any type, including a Public Land Mobile Network (PLMN), Public Switched Telephone Network (PSTN), LAN, metropolitan area network (MAN), wide area network (WAN), Internet, or Intranet. Network 410 may also include a dedicated fiber link or a dedicated freespace optical or radio link. If implemented as a PLMN, network 440 may further include packet-switched sub-networks, such as, for example, General Packet Radio Service (GPRS), Cellular Digital Packet Data (CDPD), and Mobile IF sub-networks.

Optical link/network 415 may include a link that may carry light throughout the electromagnetic spectrum, including light in the human visible spectrum and light beyond the human-visible spectrum, such as, for example, infrared or ultraviolet light. The link may include, for example, a conventional optical fiber. Alternatively, the link may include a free-space optical path, such as, for example, through the atmosphere or outer space, or even through water or other transparent media. As another alternative, the link may include a hollow optical fiber that may be lined with photonic band-gap material.

QKD endpoints 405 may distribute Quantum Cryptographic keys via optical link/network 415. Subsequent to quantum key distribution via optical link/network 415, QKD endpoint 405a and QKD endpoint 405b may encrypt traffic using the distributed key(s) and transmit the traffic via network 410.

It will be appreciated that the number of components illustrated in FIG. 4 are provided for explanatory purposes only. A typical network may include more or fewer components than are illustrated in FIG. 4.

Exemplary QKD Endpoint

Figure 5:
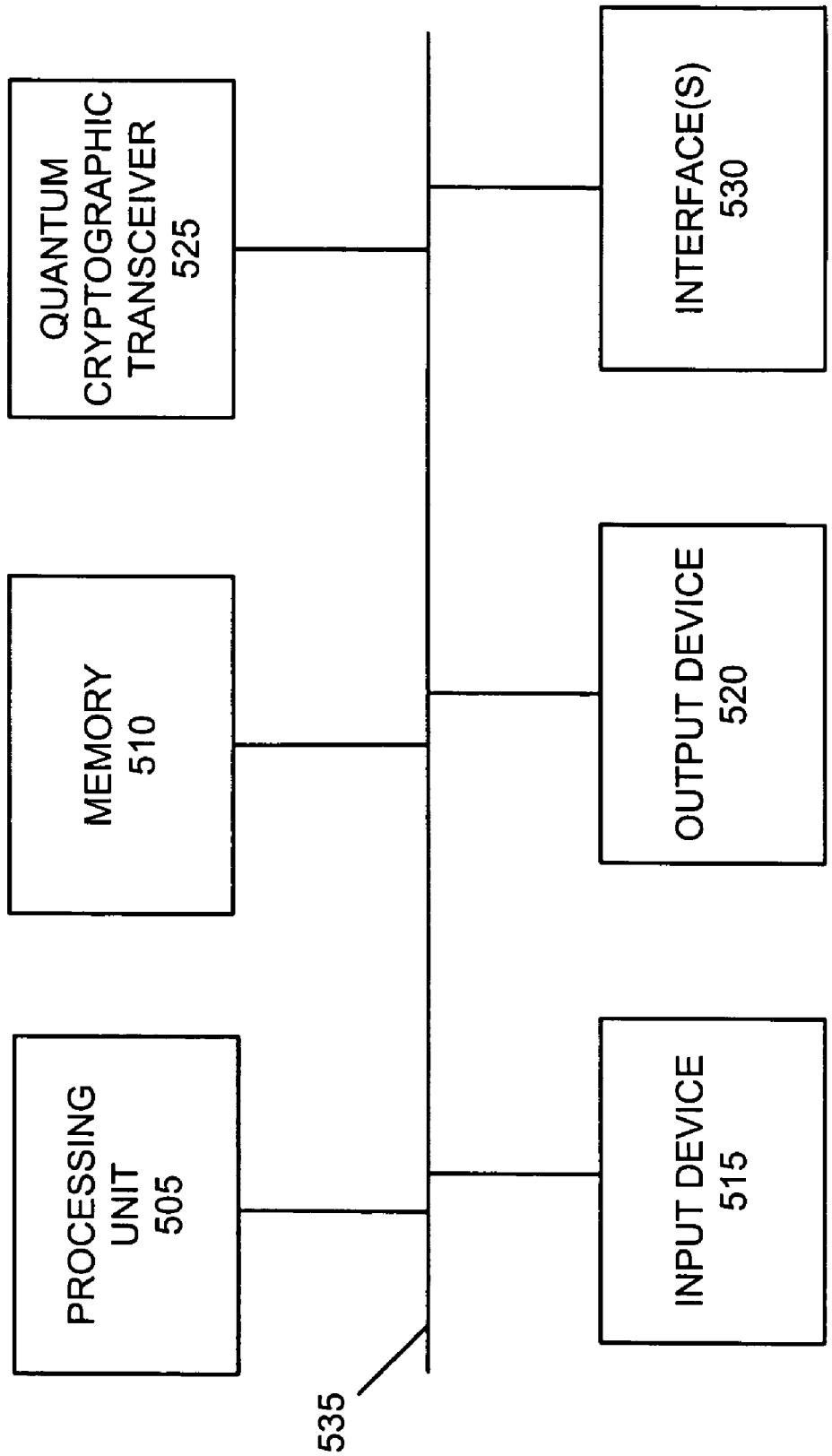
FIG. 5 is a detailed block diagram of an exemplary quantum key distribution endpoint.

FIG. 5 illustrates exemplary components of a QKD endpoint 405 consistent with the present invention. QKD endpoint 405 may include a processing unit 505, a memory 510, an input device 515, an output device 520, a quantum cryptographic transceiver 525, an interface(s) 530 and a bus 535. Processing unit 505 may perform all data processing functions for inputting, outputting, and processing of QKD endpoint data. Memory 510 may include Random Access Memory (RAM) that provides temporary working storage of data and instructions for use by processing unit 505 in performing processing functions. Memory 510 may additionally include Read Only Memory (ROM) that provides permanent or semi-permanent storage of data and instructions for use by processing unit 505. Memory 510 can also include large-capacity storage devices, such as a magnetic and/or optical recording medium and its corresponding drive.

Input device 515 permits entry of data into QKD endpoint 405 and may include a user interface (not shown). Output device 520 permits the output of data in video, audio, and/or hard copy format. Quantum cryptographic transceiver 525 may include mechanisms for transmitting and receiving encryption keys using quantum cryptographic techniques. Interface(s) 530 may interconnect QKD endpoint 405 with link/network 415. Bus 535 interconnects the various components of QKD endpoint 405 to permit the components to communicate with one another.

Exemplary Quantum Cryptographic Transceiver

Figure 6:
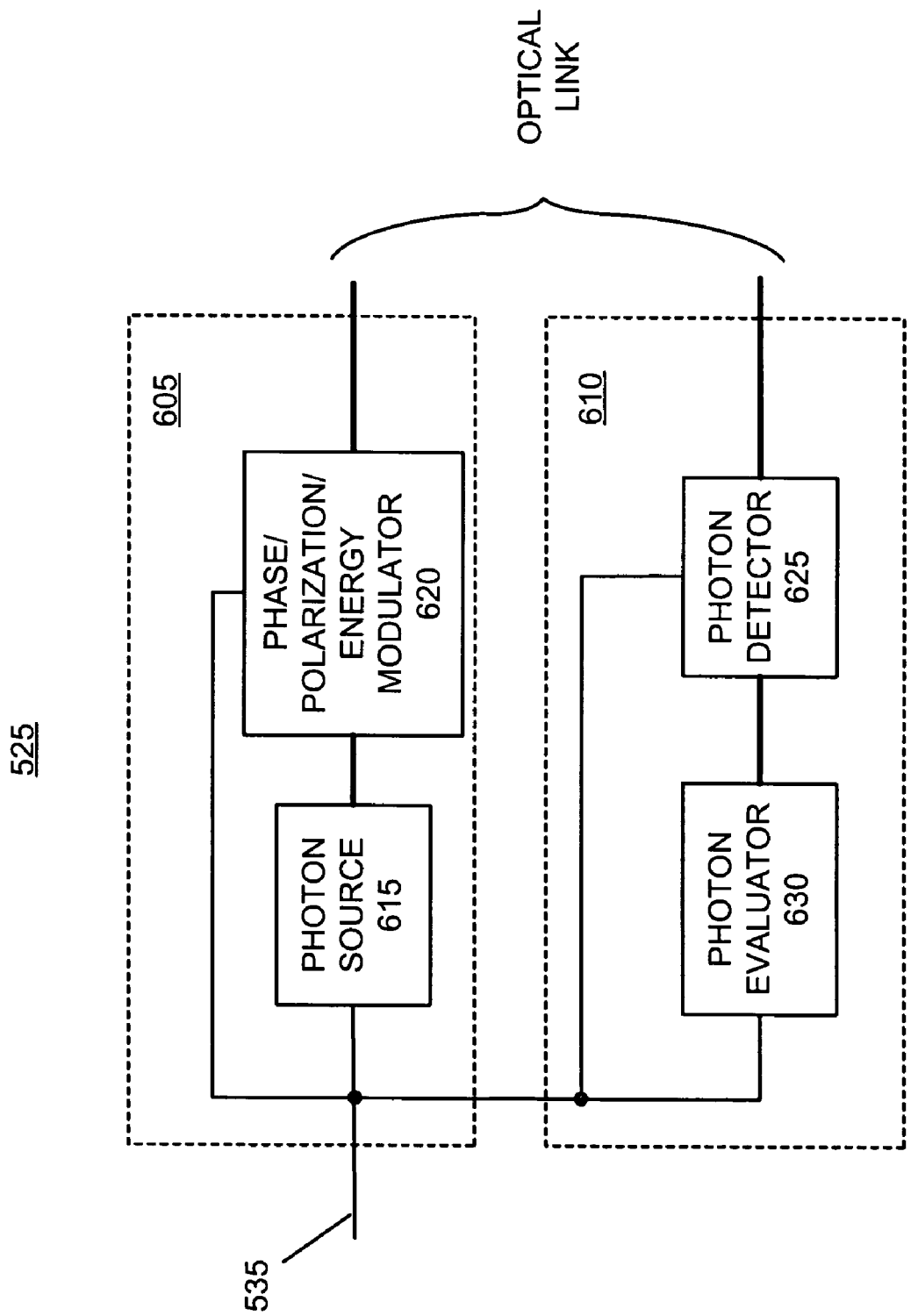
FIG. 6 is a detailed block diagram of an exemplary quantum transceiver.

FIG. 6 illustrates exemplary components of quantum cryptographic transceiver 525 of QKD endpoint 405 consistent with the present invention. Quantum cryptographic transceiver 525 may include a QKD transmitter 605 and a QKD receiver 610. QKD transmitter 605 may include a photon source 615 and a phase/polarization/energy modulator 620. Photon source 615 can include, for example, a conventional laser. Photon source 615 may produce photons according to instructions provided by processing unit 505. Photon source 615 may produce photons of light with wavelengths throughout the electromagnetic spectrum, including light in the human visible spectrum and light beyond the human-visible spectrum, such as, for example, infrared or ultraviolet light. Phase/polarization/energy modulator 620 can include, for example, conventional Mach-Zehnder interferometers. Phase/polarization/energy modulator 620 may encode outgoing photons from the photon source according to commands received from processing unit 505 for transmission across an optical link, such as link 415.

QKD receiver 610 may include a photon detector 625 and a photon evaluator 630. Photon detector 625 can include, for example, conventional avalanche photo detectors (APDs) or conventional photo-multiplier tubes (PMTs). Photon detector 625 can also include cryogenically cooled detectors that sense energy via changes in detector temperature or electrical resistivity as photons strike the detector apparatus. Photon detector 625 can detect photons received across the optical link. Photon evaluator 630 can include conventional circuitry for processing and evaluating output signals from photon detector 625 in accordance with quantum cryptographic techniques.

Although this exemplary description is based on a "one way" quantum cryptographic system in which one device contains a laser source and the other contains detectors, the transceivers may also be based on so-called "plug and play" (round trip) technology in which one device contains both a source and detectors, and the other device contains an attenuator and Faraday mirror or other retroreflector. Implementations of this invention may use the various forms of quantum cryptographic links.

Exemplary Sifting Process

Figure 1:
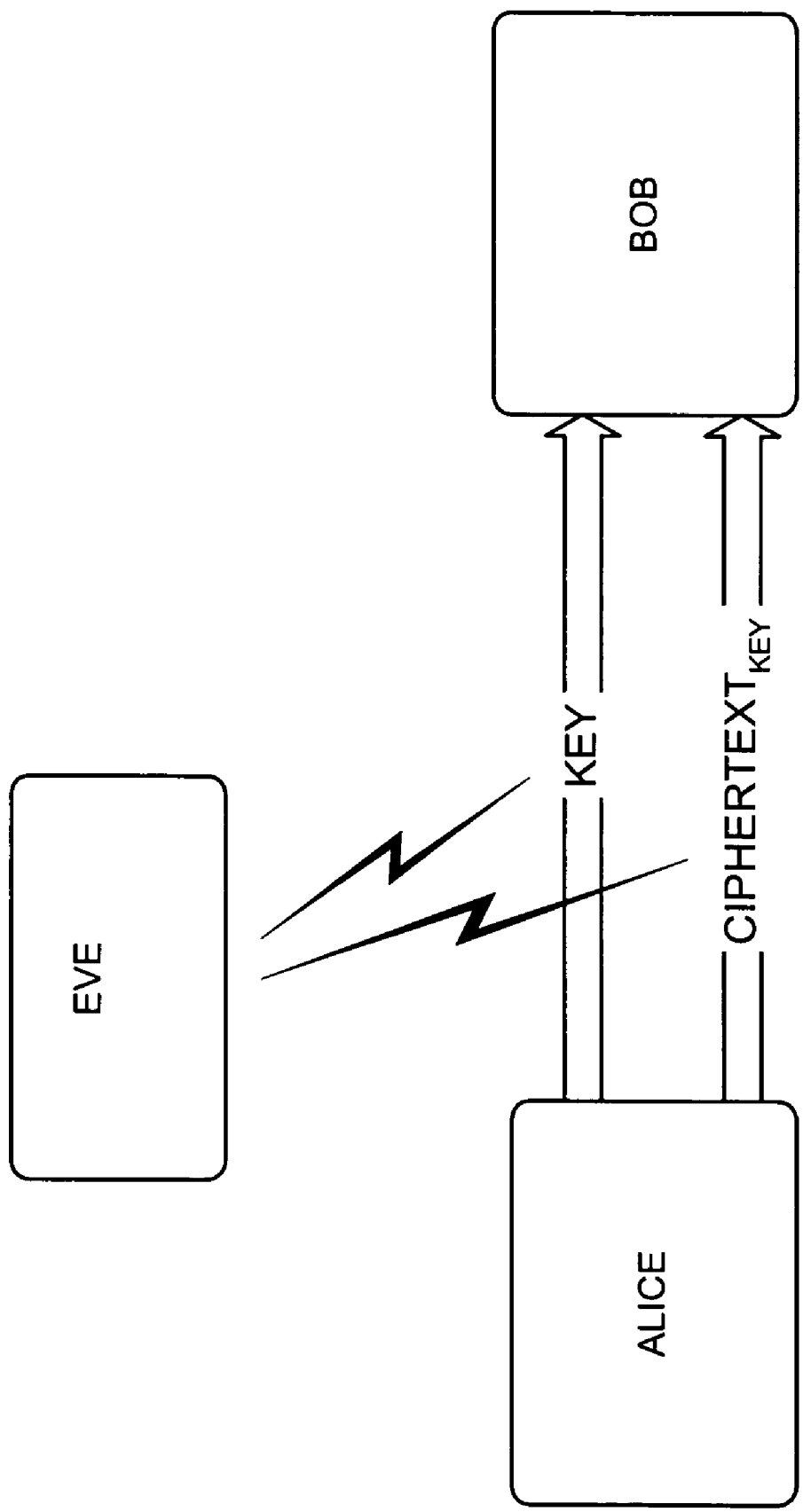
FIG. 1 illustrates a conventional key distribution process.
Figure 2:
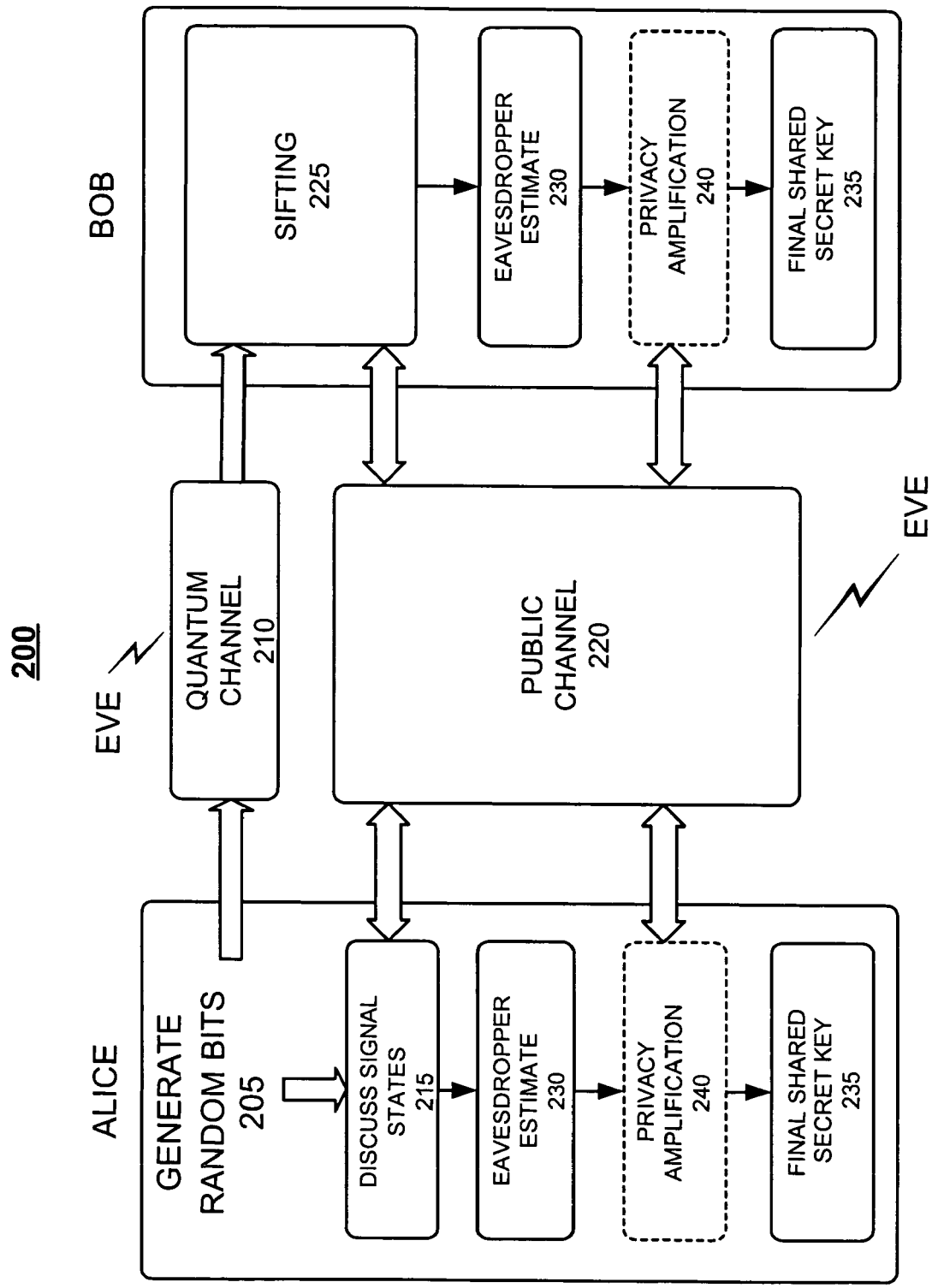
FIG. 2 illustrates an existing quantum cryptographic key distribution (QKD) process.
Figure 3:
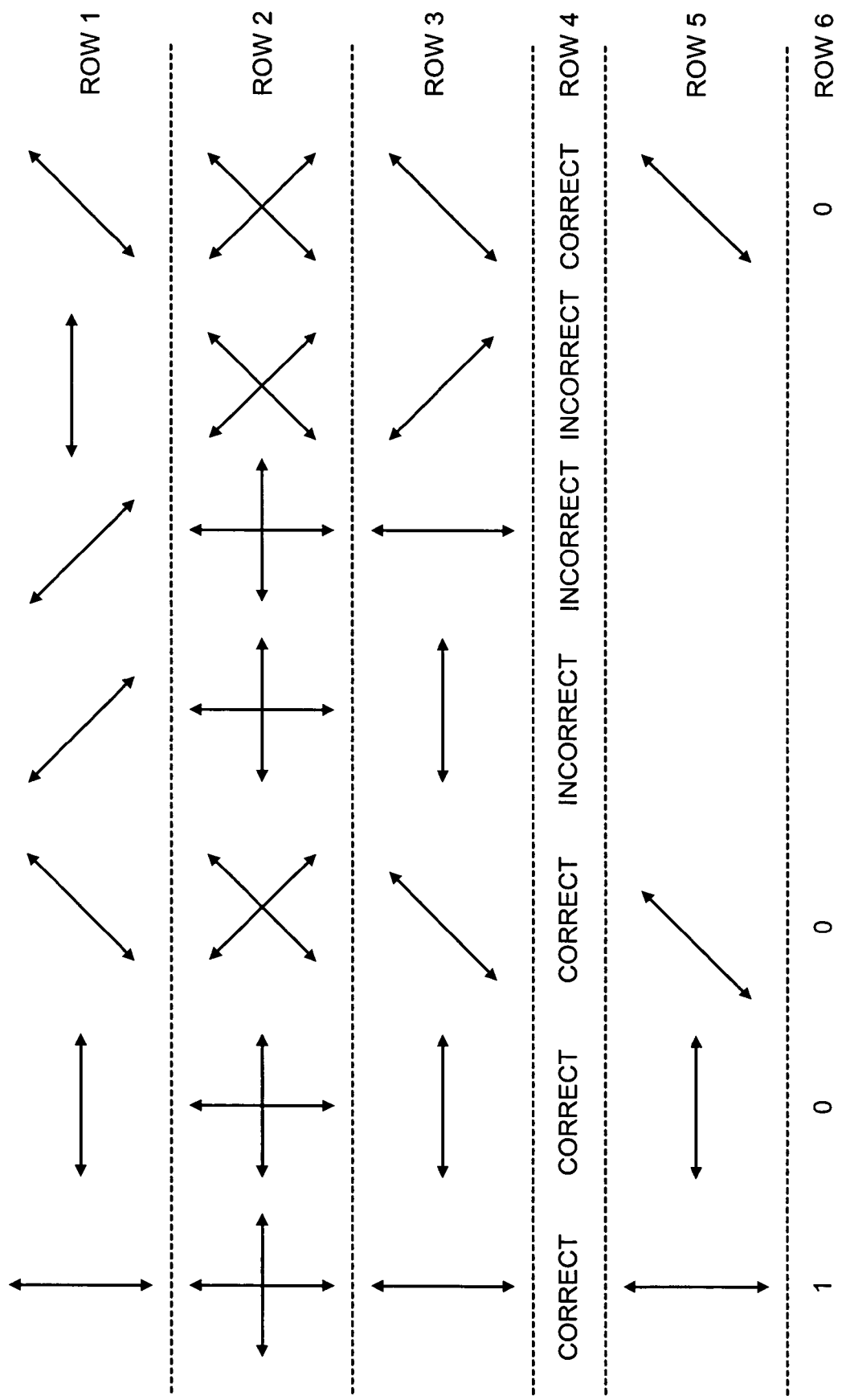
FIG. 3 provides an example of a quantum cryptographic sifting process.
Figure 7:
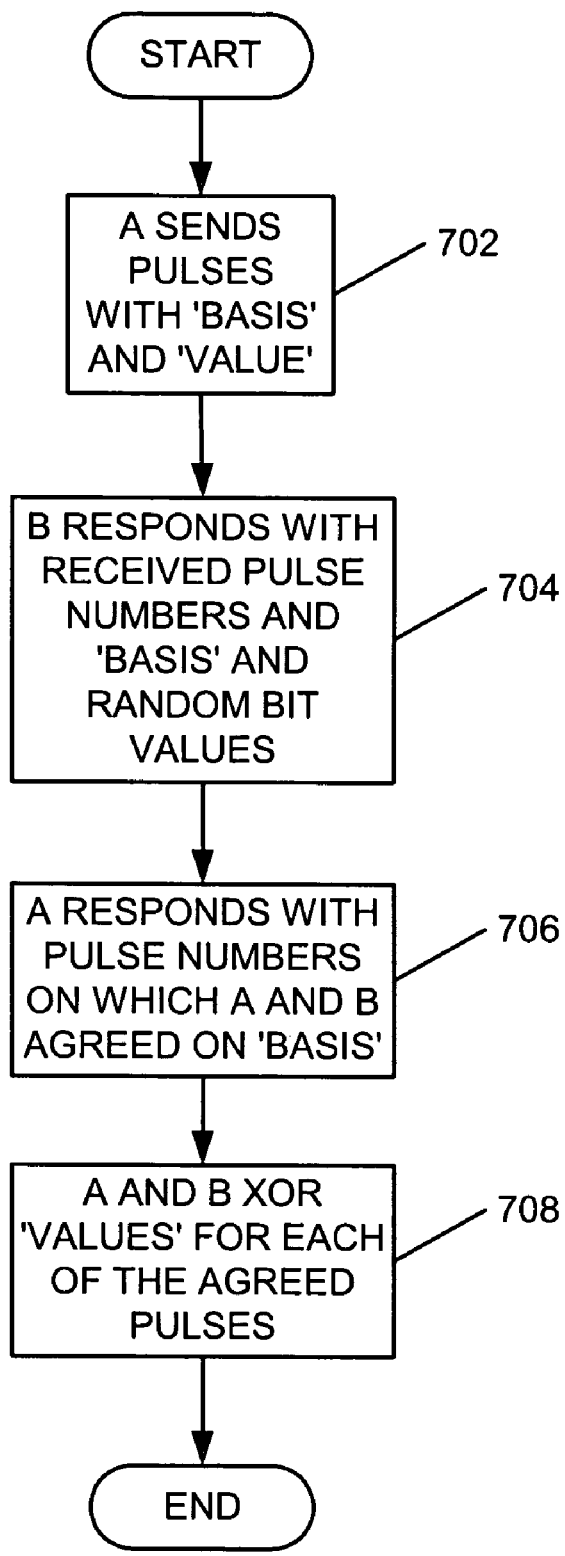
FIG. 7 is a flowchart that illustrates an exemplary sifting process consistent with principles of the invention.
Figure 8:
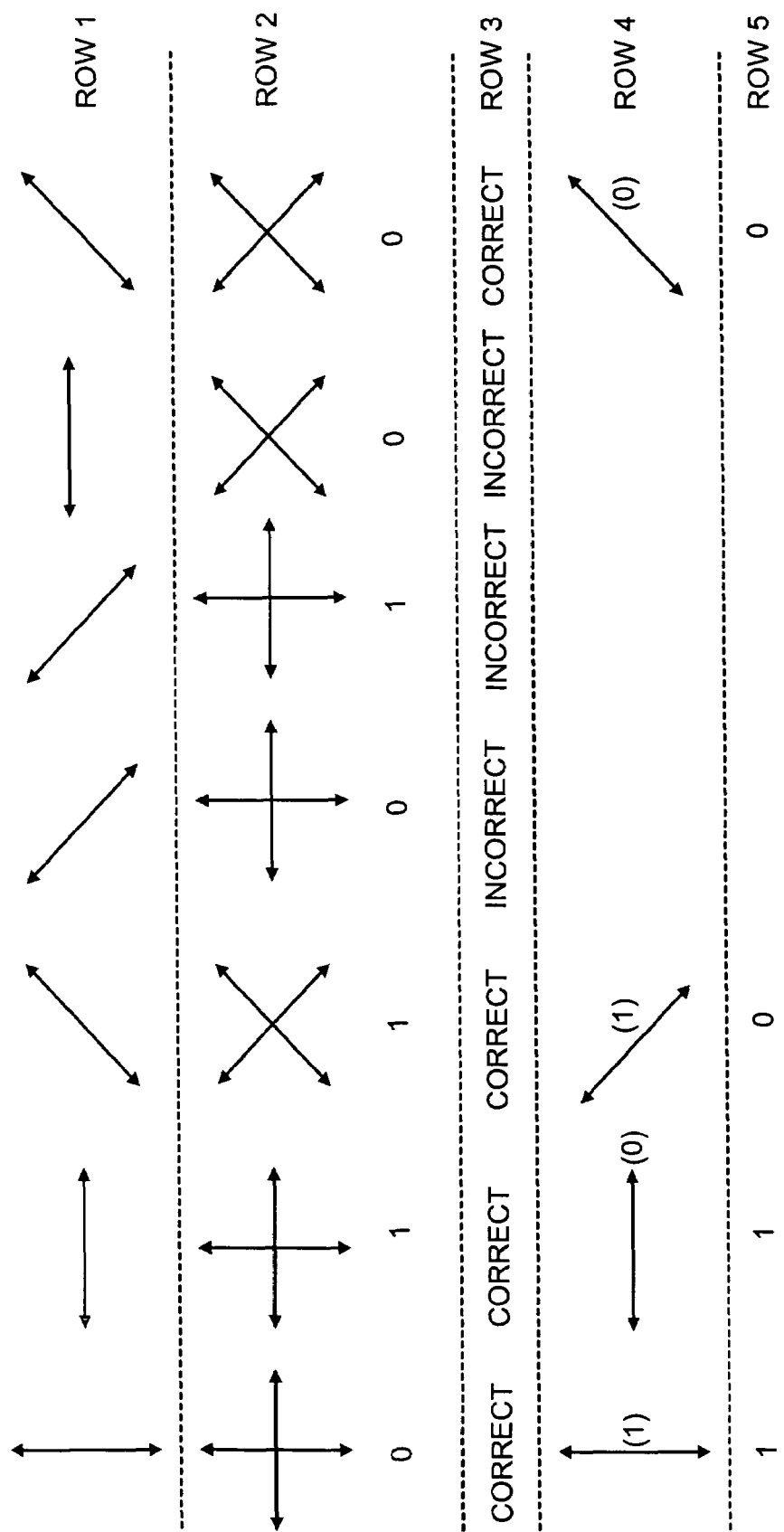
FIG. 8 is an example of sifting using the process of FIG. 7.

FIG. 7 is a flowchart that illustrates an exemplary sifting process that may be implemented in QKD endpoint 405 consistent with the principles of the invention. FIG. 3 illustrates a classical sifting process. The exemplary process illustrated in FIG. 7 is an augmented classical sifting process. FIG. 8 is a sifting example that is used to help explain the process of FIG. 7.

Processing unit 505 of QKD endpoint 405a may begin by causing transceiver 525 to send pulses or photons with a random basis (for example, polarity) and value (act 702). As can be seen in row 1 of FIG. 8, going from left to right, Alice ("A") sends the first two pulses using a rectilinear basis. "A" sends the next three pulses using a diagonal basis. "A" then sends a sixth pulse using a rectilinear basis and a seventh pulse using a diagonal basis.

Next, processing unit 505 of QKD endpoint 405b causes transceiver 525 to measure the received photons using a random basis. QKD endpoint 405b may respond to "A" with a basis and a random bit value (0 or 1) for each received pulse (act 704). The random bit values may be sent to "A" unencrypted over network 410. As shown in row 2 of FIG. 8, from left to right, Bob, ("B") responds, indicating that the first two pulses were measured using a rectilinear basis, the third pulse was measured using a diagonal basis, the fourth and fifth pulses were measured using a rectilinear basis, and the sixth and seventh pulses were measured using a diagonal basis. "B" may also include random bits, 0, 1, 1, 0, 1, 0, 0 with the response.

QKD endpoint 405a receives the response from "B". Processor 505 of QKD endpoint 405a evaluates the response, determines which responses from "B" are correct, and causes QKD endpoint 405a to transmit to "B" an indication of which pulses "A" and "B" agree on the basis (act 706). As can be seen in row 3 of FIG. 8, "A" indicates to "B" that they agree on the basis of the first three pulses and the seventh pulse.

Figure 9:
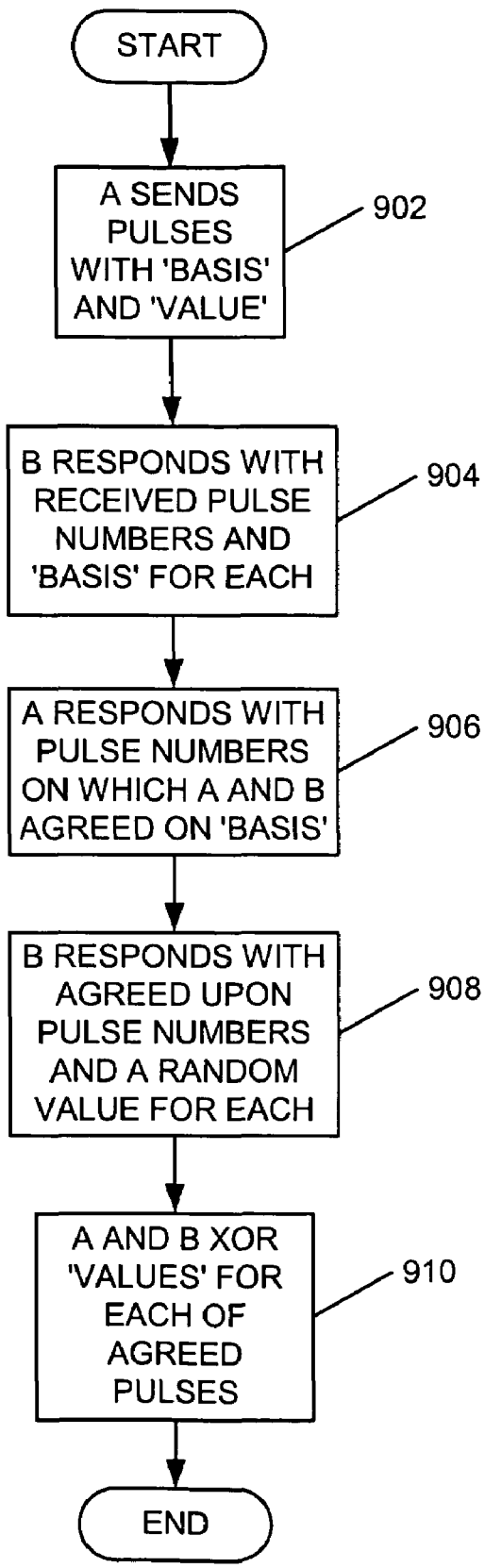
FIG. 9 is a flowchart that illustrates another exemplary sifting process consistent with the principles of the invention.
Figure 10:
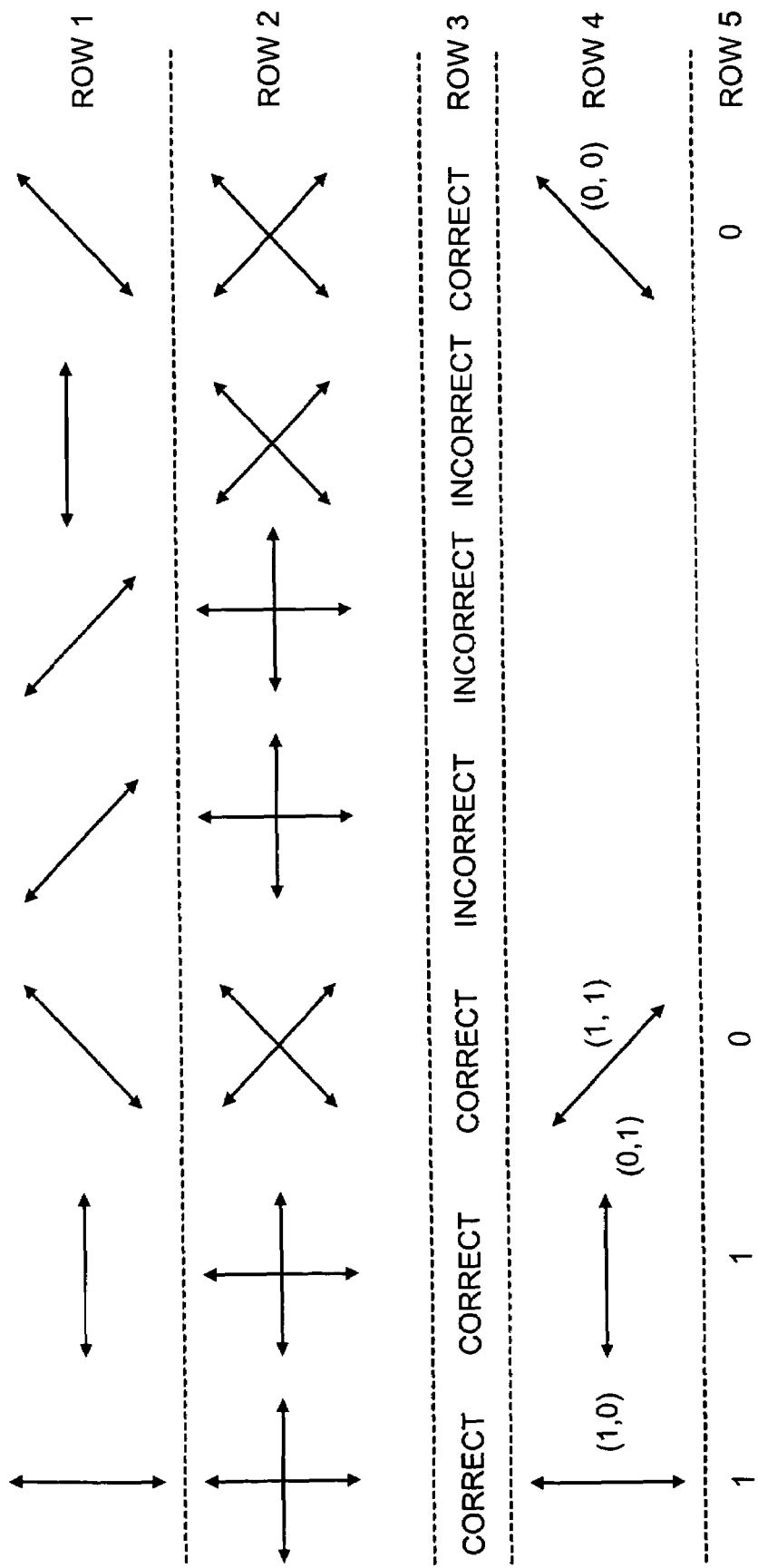
FIG. 10 is an example of sifting using the process of FIG. 9.

QKD endpoint 405b receives the indication from "A". At this point, both sides, "A" and "B", know the pulses upon which there is basis agreement and the random bits sent by "B," as indicated by row 2 of FIG. 8. Corresponding processors 505 of QKD endpoints 404a and 405b retrieve the values of the agreed-upon pulses and exclusive-or each of the values with the corresponding random bit sent by "B" (act 708). QKD endpoints 405a and 405b may have previously stored the values and the random bits generated by "B" in respective memories 510. As can be seen in row 4 of FIG. 8, the agreed-upon pulses are the first three pulses and the seventh pulses, with respective values 1, 0, 1, and 0. Exclusive or'ing the values 1, 0, 1, and 0 with the random bit values 0, 1, 1, 0, respectively, results in 1, 1, 0, and 0, which may then be used as a cryptographic key or may be input to privacy amplification 240, which may generate a cryptographic key from 1, 1, 0, and 0 based on a hash function. The above process is an improvement over the process, illustrated in FIG. 3, in that multiple parties, A and B contribute randomness to the sifting process, thereby decreasing the possibility of generating a biased cryptographic key FIG. 9 is a flowchart that illustrates a second exemplary sifting process that may be implemented in QKD endpoint 405 consistent with the principles of the invention. FIG. 10 is a sifting example that is used to help explain the process of FIG. 9.

Processing unit 505 of QKD endpoint 405a may begin by causing transceiver 525 to send pulses or photons with a random basis and value (act 902). As can be seen in row 1 of FIG. 10, going from left to right, "A" sends the first two pulses using a rectilinear basis. "A" sends the next three pulses using a diagonal basis. "A" then sends a sixth pulse using a rectilinear basis and a seventh pulse using a diagonal basis.

Next, processing unit 505 of QKD endpoint 405b causes transceiver 525 to measure the received pulses or photons using a random basis and QKD endpoint 405b may respond to "A" with a basis, which may be randomly selected, for each received pulse (act 904). QKD endpoint 405b may send the response unencrypted over network 410. As shown in row 2 of FIG. 10, from left to right, "B" responds indicating that the first two pulses were measured using the rectilinear basis, the third pulse was measured using the diagonal basis, the fourth and fifth pulses were measured using the rectilinear basis, and the sixth and seventh pulses were measured using the diagonal basis.

QKD endpoint 405a receives the response from "B". Processor 505 of QKD endpoint 405a evaluates the received response, determines which responses from "B" are correct, and transmits to "B" an indication of which pulses "A" and "B" agree on a basis (act 906). As can be seen in row 3 of FIG. 10, "A" indicates to "B" that they agree on the basis of the first three pulses and the seventh pulse.

QKD endpoint 405b receives the indication from "A". At this point, both sides, "A" and "B", know the pulses upon which there is a basis agreement. Processor 505 of QKD endpoint 405b may generate a random bit (0 or 1) corresponding to each pulse in which there is agreement with "A" and processor 505 may cause QKD endpoint 405b to send agreed-upon pulse numbers with the corresponding random bit value for each agreed-upon pulse number (act 908). The random bit values may be sent to "A" unencrypted over network 410. As shown in row 4 of FIG. 10, the first agreed-upon pulse has a value of 1 and a corresponding random bit value of 0 (the first number in parentheses is a pulse value and the second number is a random bit value generated by "B"). The second pulse has a value of 0 and a corresponding random bit value of 1. The third pulse has a value of 1 and a corresponding random bit value of 1. The last pulse has a value of 0 and a corresponding random bit value of 1.

QKD endpoint 405a receives the pulse numbers and random bits from "B" and processor 505 of QKD endpoint 405a may store the random bit values in memory 510. Corresponding processors 505 of QKD endpoints 404a and 405b may retrieve the values of the agreed-upon pulses and the corresponding random bits values from "B" and may exclusive-or each of the values of the agreed-upon pulses with the corresponding random bit values (act 910). The corresponding random bit values generated by "B" are 0, 1, 1, and 0, as can be seen in row 4 of FIG. 10. Exclusive or'ing the pulse values 1, 0, 1, and 0 with the random bit values 0, 1, 1, 0, respectively, results in 1, 1, 0, and 0, which may then be used as a cryptographic key (row 5 of FIG. 10) or may be input to privacy amplification 240, which may generate a cryptographic key from 1, 1, 0, and 0 based on a hash function.

Variations

The above processes and examples in FIGS. 8-10 are exemplary and are not limiting. Many other implementations consistent with the principles of the invention may also be used. For example, the newer "Geneva" protocol can be augmented using techniques, as described above, such that both parties, "A" and "B" contribute random values to the sifting process.

As an alternative to one of the user's ("B") sending explicit random bits for each of the agreed-upon pulses, the user may, from time to time, send a group of random bits to the other user ("A"). The group of random bits may be used as a seed for a pseudo-random number generator that may expand the group of random bits to a series of pseudo-random values. These pseudo-random values may then be used during the sifting process instead of the random values provided by "B". Although, the examples provided above include multi-party randomness in a quantum sifting process, the invention is not limited to only the sifting process. Alternative implementations may include numerous ways in which multi-party randomness may be included. For example, second-party randomness may also be incorporated during an error detection and correction process by a number of different techniques. As one example, random values may be included by the second party alongside indications of bit ranges in which errors are being detected or corrected, and/or alongside parity information for bit fields. As another example, random values may be included alongside forward-error correction information such as cyclic redundancy checks, checksums, Reed-Solomon codes, BCH codes, or other forms of error detection and correction information. Both "A" and "B" may derive a key by performing an operation, such as, for example, an exclusive-or'ing operation, of properly received and measured random bits sent from "A" to "B" and the random bits contributed by "B". Alternatively, the group of random bits provided by "B" may be used as a seed for a pseudo-random number generator, as discussed above. As may be apparent to those skilled in the art, such injections of second-party randomness may be readily included in both interactive and one-way forms of error detection and correction processes.

Implementations consistent with the principles of the invention may be adopted for use with one-way systems, plug and play (round trip) quantum systems, and systems based on entanglement.

CONCLUSION

Systems and methods consistent with the present invention, therefore, provide mechanisms for performing a sifting process in a quantum cryptographic system, such that both parties contribute to the randomness of the cryptographic key.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible.

While series of acts have been described with regard to FIGS. 7 and 9, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method for performing quantum key distribution in a quantum cryptographic system, the method comprising:
   contributing a first set of random values, from a first endpoint, to a quantum key distribution process;
   contributing a second set of random values, from a second endpoint, to the quantum key distribution process, where the second contributing act comprises:
      sending, from the second endpoint to the first endpoint, a plurality of random bits,
      using, by the first endpoint, the plurality of random bits as a seed for a pseudo-random number generator, and
      expanding, by the pseudo-random number generator, the seed to a series of pseudo-random values; and
   deriving, at the first and the second endpoints, a key based on at least some of the first set of random values and one of at least some of the second set of random values or at least some of the pseudo-random values.

2. The method of claim 1, where:
   the second contributing act is performed during a sifting process.

3. The method of claim 1, where:
   the second contributing act is performed during an error detection and correction process.

4. The method of claim 1, where:
   the first contributing act comprises:
   sending each one of the first set of random values using a randomly generated basis.

5. The method of claim 4, where the basis includes a type of polarization.

6. The method of claim 4, where the basis includes a phase modulation.

7. The method of claim 4, where:
   the second contributing act comprises:
   sending an indication of received pulses and a basis for each of the received pulses.

8. The method of claim 7, where the deriving comprises:
   sending, from the first endpoint, an indication of the pulses upon which the first and the second endpoints agree, and
   using ones of the second set of random values, provided by the second endpoint, to perform an operation with ones of the first set of random values corresponding to the pulses upon which the first and the second endpoints, the key being based on a result of the operation.

9. The method of claim 7, where the second contributing act further comprises:
   sending the second set of random values with the indication of received pulses, each one of the second set of random values corresponding to a different one of the received pulses.

10. The method of claim 7, where the second contributing act further comprises:
    sending the second set of random variables in response to receiving, from the first endpoint, an indication of the pulses upon which the first and the second endpoints agree, each one of the second set of random variables corresponding to a different one of the pulses upon which the first and the second endpoints agree.

11. The method of claim 1, where the quantum cryptographic system is a one-way type quantum system.

12. The method of claim 1, where the quantum cryptographic system is a plug and play type quantum system.

13. The method of claim 1, where the quantum cryptographic system is based on entanglement.

14. The method of claim 1, where:
    the first endpoint performs the quantum key distribution process via a freespace optical link.

15. The method of claim 1, where:
    the first endpoint performs the quantum key distribution process via a link including fiber.

16. The method of claim 1, where the deriving comprises:
performing an exclusive-or operation on at least some of the first random values and at least some of the second random values, the key being based on a result of the exclusive- or operation.

17. The method of claim 1, where the second contributing act comprises:
sending the second set of random values unencrypted to the first endpoint.

18. A quantum cryptographic system comprising:
a first quantum key distribution endpoint; and
a second quantum key distribution endpoint, where the second quantum key distribution endpoint:
  contributes a second set of random values to a quantum key distribution process, and
  sends a plurality of random bits, including the second set of random values, to the first quantum key distribution endpoint,
where the first quantum key distribution endpoint:
  contributes a first set of random values to the quantum key distribution process, and
  uses the plurality of random bits as a seed for a pseudo-random number generator, such that the pseudo-random number generator expands the seed to a series of pseudo-random values, and
where the first and second key distribution endpoints:
  communicate via a quantum channel therebetween, and
  derive a key based on at least some of the first set of random values and one of at least some of the second set of random values or at least some of the pseudo-random values.

19. The quantum cryptographic system of claim 18, where:
the second quantum key distribution endpoint is configured to contribute the second set of random values during a sifting process.

20. The quantum cryptographic system of claim 18, where:
the second quantum key distribution endpoint is configured to contribute the second set of random values during an error detection and correction process.

21. The quantum cryptographic system of claim 18, where:
the at least some of the first set of random values are ones of the first set of random values that are correctly received and measured by the second quantum key distribution endpoint, and
each of the at least some of the second set of random values corresponds to a different one of the at least some of the first set of random values.

22. The quantum cryptographic system of claim 21, where:
the first and the second endpoints are further configured to derive the key based on a result of performing an exclusive-or operation on each one of the at least some of the second set of random values with corresponding ones of the at least some of the first set of random values.

23. The quantum cryptographic system of claim 18, where:
the first quantum key distribution endpoint is configured to:
  send each one of the first set of random values using a basis, and
the second quantum key distribution endpoint is configured to:
  receive at least a portion of the first set of random values and measure each one of the at least a portion of the first set of random values using a separately selected basis, and
  send an indication for each of the at least a portion of the first set of random values and an indication of the separately selected basis for the each of the at least a portion of the first set of random values to the first quantum key distribution endpoint.

24. The quantum cryptographic system of claim 23, where:
each of the bases includes a type of polarization.

25. The quantum cryptographic system of claim 23, where:
each of the bases includes a phase modulation.

26. The quantum cryptographic system of claim 23, where:
each of the bases is randomly selected.

27. The quantum cryptographic system of claim 23, where:
the first quantum key distribution endpoint is further configured to:
  send an indication of ones of the first set of random values, in which the first and the second quantum key distribution endpoints are in agreement on the basis, to the second quantum key distribution endpoint.

28. The quantum cryptographic system of claim 23, where:
when the second quantum key distribution endpoint sends the at least a portion of the first set of random values to the first quantum key distribution endpoint, the second quantum key distribution endpoint includes a second set of random values, each of the second set of random values corresponding to a different one of the at least a portion of the first set of random values.

29. The quantum cryptographic system of claim 27, where:
when the second quantum key distribution endpoint receives the indication of ones of the first set of random values, in which the first and the second quantum key distribution endpoints are in agreement on the basis, the second quantum key distribution endpoint is configured to send, to the first quantum key distribution endpoint, the second set of random values.

30. The quantum cryptographic system of claim 18, where:
the first and the second endpoints are further configured to derive the key based on a result of performing an exclusive-or operation on at least some of the second set of random values with corresponding ones of at least some of the first set of random values.

31. The quantum cryptographic system of claim 18, where:
the quantum cryptographic system is a one-way type quantum system.

32. The quantum cryptographic system of claim 18, where:
the quantum cryptographic system is a plug and play type quantum system.

33. The quantum cryptographic system of claim 18, where:
the quantum cryptographic system is based on entanglement.

34. The quantum cryptographic system of claim 18, where:
the second quantum key distribution endpoint is configured to send, unencrypted, the second set of random values to the first quantum key distribution endpoint.

35. A quantum key distribution endpoint comprising:
a bus;
a transceiver coupled to the bus;
a memory coupled to the bus; and
a processing unit coupled to the bus, wherein:
the memory includes a plurality of instructions for the processing unit, such that when the quantum key distribution endpoint is configured as a first quantum key distribution endpoint, the processing unit is configured to:
  contribute a first set of random values to a quantum key distribution process with a second quantum key distribution endpoint,
  receive a second set of random values from the second quantum key distribution endpoint, receive a plurality of random bits, including the second set of random values, from the first quantum key distribution endpoint, use the plurality of random bits as a seed for a pseudo-random number generator, such that the pseudo-random number generator is configured to expand the seed to a series of pseudo-random number values, and derive a key based on at least some of the first set of random values and one of at least some of the second set of random values or at least some of the pseudo-random number values.

36. The quantum key distribution endpoint of claim 35, where:

when the quantum key distribution endpoint is a second quantum key distribution endpoint, the processing unit is further configured to:

contribute the second set of random values during a sifting process.

37. The quantum key distribution endpoint of claim 35, where:

when the quantum key distribution endpoint is a second quantum key distribution endpoint, the processing unit is further configured to:

contribute the second set of random values during an error detection and correction process.

38. The quantum key distribution endpoint of claim 35, where:

the processing unit is further configured to:

use a basis when sending each of the first set of random values.

39. The quantum key distribution endpoint of claim 38, where:

the basis is a type of polarization, the polarization being one of diagonal and rectilinear.

40. The quantum key distribution endpoint of claim 38, where:

the basis includes a phase modulation.

41. The quantum key distribution endpoint of claim 38, where:

each one of the bases is randomly selected.

42. The quantum key distribution endpoint of claim 35, where:

when the quantum key distribution endpoint is a second quantum key distribution endpoint, the processing unit is further configured to:

send an indication of received ones of the first set of random values and a selected basis for each of the received ones of the first set of random values.

43. The quantum key distribution endpoint of claim 35, where:

when the quantum key distribution endpoint is a first quantum key distribution endpoint, the processing unit is further configured to:

receive an indication of received ones of the first set of random values and a basis from a second quantum key distribution endpoint, and send an indication, to the second quantum key distribution endpoint, of which ones of the first set of random values the first and the second quantum key distribution endpoints agree.

44. The quantum key distribution endpoint of claim 35, where:

when the quantum key distribution endpoint is a second quantum key distribution endpoint, the processing unit is further configured to:

send, to a first quantum key distribution endpoint, an indication of received ones of the first set of random values and the second set of random values, each one of the second set of random values corresponds to a received one of the first set of random values.

45. The quantum key distribution endpoint of claim 35, where:

the processing unit is further configured to:

derive the key based on a result of performing an exclusive-or operation on the at least some of the first set of random variables and the at least some of the second set of random variables.

46. The quantum key distribution endpoint of claim 35, where:

when the quantum key distribution endpoint is a second quantum key distribution endpoint, the processing unit is further configured to:

send a plurality of random bits, including the second set of random values, to a first quantum key distribution endpoint.

47. The quantum key distribution endpoint of claim 35, where:

the processing unit is further configured to derive the key based on a result of performing an exclusive-or operation on at least some of the series of pseudo-random values with corresponding ones of the at least some of the first set of random values.

48. The quantum key distribution endpoint of claim 35, where:

the quantum key distribution endpoint is configured to operate in a one-way type quantum system.

49. The quantum key distribution endpoint of claim 35, where:

the quantum key distribution endpoint is configured to operate in a plug and play type quantum system.

50. The quantum key distribution endpoint of claim 35, where:

the quantum key distribution endpoint is configured to operate in system based on entanglement.

51. The quantum key distribution endpoint of claim 35, where when the quantum key distribution endpoint is a second quantum key distribution endpoint, the processing unit is further configured to:

send the second set of random values unencrypted to a first quantum key distribution endpoint.

52. A machine-readable medium having a plurality of instructions recorded therein, such that when the plurality of instructions are executed by a processor of a quantum key distribution endpoint, the processor is configured to:

contribute a first set of random values to a quantum key distribution process, receive a second set of random values, for the quantum key distribution process, from a second endpoint, receive a plurality of random bits, including the second set of random values, from the second endpoint, use the plurality of random bits as a seed to a pseudo-random number generator, expand, via the pseudo-random number generator, the seed to a series of pseudo-random values, and derive a key based on at least some of the first set of random values and one of at least some of the second set of random values or at least some of the pseudo-random values.

53. The machine-readable medium of claim 52, where the processor is further configured to:

send each one of the first set of random values, to another quantum key distribution endpoint, using a basis.

54. The machine-readable medium of claim 53, where each of the bases includes a type of polarization.

55. The machine-readable medium of claim 53, where each of the bases is a phase modulation.

56. The machine-readable medium of claim 53, where each of the bases is randomly selected.

57. The machine-readable medium of claim 52, where processor is further configured to:
receive an indication of received ones of a plurality of pulses and a plurality of selected bases from the second endpoint, each one of the received ones of the pulses corresponding to one of at least some of the first set of random values, and
send an indication of the pulses upon which the quantum key distribution endpoint agrees with the second endpoint.

58. The machine-readable medium of claim 57, where:
the processor is further configured to:
receive at least some of the second set of random values with the indication of the received ones of the pulses and the plurality of selected bases from the second endpoint.

59. The machine-readable medium of claim 57, where:
the processor is further configured to:
receive at least some of the second set of random values from the second endpoint after sending the indication of the pulses upon which the quantum key distribution endpoint agrees with the second endpoint.

60. The machine-readable medium of claim 52, where:
the operation includes an exclusive-or operation.

\* \* \* \* \*